(12) United States Patent
Yasugi et al.

(10) Patent No.: US 8,324,751 B2
(45) Date of Patent: Dec. 4, 2012

(54) WIND TURBINE GENERATOR SYSTEM AND WIND TURBINE GENERATOR

(75) Inventors: Akira Yasugi, Tokyo (JP); Masayuki Hashimoto, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/113,143

(22) Filed: May 23, 2011

(65) Prior Publication Data

US 2012/0061960 A1    Mar. 15, 2012

Related U.S. Application Data

(63) Continuation of application No. PCT/JP2011/055086, filed on Mar. 4, 2011.

(51) Int. Cl.
*F03D 9/00* (2006.01)
*H02P 9/04* (2006.01)

(52) U.S. Cl. ............................. 290/44; 290/55

(58) Field of Classification Search .................... 290/44, 290/50, 55
See application file for complete search history.

(56) References Cited

U.S. PATENT DOCUMENTS

| | | | |
|---|---|---|---|
| 7,394,166 B2* | 7/2008 | Teichmann et al. | 290/44 |
| 7,476,987 B2* | 1/2009 | Chang | 290/55 |
| 2008/0179887 A1* | 7/2008 | Kawazoe et al. | 290/44 |
| 2010/0213712 A1* | 8/2010 | Arinaga et al. | 290/44 |
| 2011/0204630 A1* | 8/2011 | Arinaga et al. | 290/44 |
| 2011/0227343 A1* | 9/2011 | Yasugi et al. | 290/44 |
| 2011/0320052 A1* | 12/2011 | Yasugi | 700/287 |
| 2012/0049517 A1* | 3/2012 | Yasugi | 290/44 |
| 2012/0056425 A1* | 3/2012 | Cousineau | 290/44 |
| 2012/0061959 A1* | 3/2012 | Yasugi et al. | 290/44 |
| 2012/0061961 A1* | 3/2012 | Yasugi et al. | 290/44 |

FOREIGN PATENT DOCUMENTS

| | | |
|---|---|---|
| JP | 10164896 A | 6/1998 |
| JP | 2003254221 A | 9/2003 |
| JP | 2005012906 A | 1/2005 |
| JP | 2005051955 A | 2/2005 |
| JP | 2008182859 | 8/2008 |

OTHER PUBLICATIONS

International Search Report for PCT/JP2011/055086, mailed Jun. 7, 2011.

* cited by examiner

*Primary Examiner* — Hae Hyeon
(74) *Attorney, Agent, or Firm* — Kanesaka, Berner & Partners

(57) ABSTRACT

An object of the present invention is to make use of wind energy as effectively as possible and increase the amount of generated energy that is supplied to a power system. A power storage apparatus is interposed between and electrically connected to a wind turbine generator and a power system. The wind turbine generator outputs, to the power system side, an amount of active power obtained by subtracting auxiliary machine loss, which is power consumed by an auxiliary machine, from the maximum active power that can be output by a generator, and if the amount of active power output from the wind turbine generator exceeds a limited power value set for the power transmission end, a charge/discharge controller that controls the power storage apparatus causes the power storage apparatus to be charged with part of the power output from the wind turbine generator.

14 Claims, 5 Drawing Sheets

WIND TURBINE GENERATOR SYSTEM AND WIND TURBINE GENERATOR

CROSS REFERENCE TO RELATED APPLICATIONS

This is a continuation of International Application PCT/JP2011/055086, with an international filing date of Mar. 4, 2011, which is hereby incorporated by reference herein in its entirety.

TECHNICAL FIELD

The present invention relates to a wind turbine generator system and a wind turbine generator.

BACKGROUND ART

Normally, a variable-speed wind turbine is controlled such that the wind turbine-end power is constant in a rated wind speed range. In this case, the following relation holds for generator power Pg, wind turbine-end power Pn, and auxiliary machine loss Ploss.

$$Pn = Pg - Ploss = \text{constant at rated power} \quad (1)$$

CITATION LIST

Patent Literature

{PTL 1}
Japanese Unexamined Patent Application, Publication No. 2008-182859

SUMMARY OF INVENTION

Technical Problem

In the relation shown in the above Equation (1), in the exemplary case where the rated power is 2,400 kW and the auxiliary machine loss Ploss is 30 kW, even if the amount of power that can be generated by the generator is 2,520 kW, the rated power is constant at 2,400 kW, and therefore the generator power Pg is suppressed to 2,430 kW (=Pn+Ploss=2400 kW+30 kW). In this case, 90 kW (=2,520 kW−2,430 kW) of wind energy is needlessly wasted.

An object of the present invention is to provide a wind turbine generator system and a wind turbine generator that enable making use of wind energy as effectively as possible and increasing the amount of generated electricity that is supplied to a power system.

Solution to Problem

A first aspect of the present invention is a wind turbine generator system including: a wind turbine generator connected to a power system; a power storage apparatus capable of being charged with power generated by the wind turbine generator or power supplied from the power system; and a charge/discharge controller that is capable of bidirectional communication with the wind turbine generator and controls charging and discharging of the power storage apparatus, wherein the wind turbine generator outputs active power resultant from subtracting auxiliary machine loss, which is power consumed by an auxiliary machine, from a maximum active power that can be output by a generator, and the charge/discharge controller causes the power storage apparatus to be charged with part of the active power output from the wind turbine generator in a case where the active power output from the wind turbine generator exceeds a limited power value set for a power transmission end.

According to such a wind turbine generator system, in the wind turbine generator, control is performed such that the maximum active power that can be output by the generator is output, that is to say, such that the generator power is maximized, and power resultant from subtracting the auxiliary machine loss, which is the amount of power consumed by an auxiliary machine, from the generator power is output to the power system side as wind turbine-end power. This prevents the generator power from being suppressed by the rated power, and enables obtaining maximum generator power that makes the best possible use of wind energy. Also, if the amount of power output from the wind turbine generator in this way exceeds the limited power value set for the power transmission end, the power storage apparatus is charged with part of the power output. Accordingly, even if an amount of active power that exceeds the limited power value set for the power transmission end is output from the wind turbine generator, that excess amount can be effectively used instead of being wasted.

In the above-described wind turbine generator system, in a case where the power storage apparatus is in a chargeable state, the wind speed is greater than or equal to a rated wind speed, and the power storage apparatus is not currently discharging, the wind turbine generator may output active power resultant from subtracting the auxiliary machine loss from the maximum active power that can be output by the generator.

If the power storage apparatus is not in a chargeable state or is currently discharging, the power storage apparatus cannot be charged, and if the wind speed is less than the rated wind speed, the generator power falls and it is impossible to obtain the maximum active power that can be output. Accordingly, in such a situation, control for maximizing the generator power is not performed.

In the above-described wind turbine generator system, the charge/discharge controller may cause the power storage apparatus to be charged with active power resultant from subtracting a rated power of the wind turbine generator from the active power output from the wind turbine generator.

This enables outputting the rated power of the wind turbine generator to the power system, and charging the power storage apparatus with the amount of excess power exceeding the rated power. It is also possible to stabilize the active power output to the power system and effectively use the excess amount of power.

In the above-described wind turbine generator system, the charge/discharge controller may cause the power storage apparatus to be charged with active power resultant from subtracting electrical power obtained by multiplying the limited power value set for the power transmission end by a predetermined coefficient less than or equal to 1, from the active power output from the wind turbine generator.

This enables preventing an amount of active power greater than or equal to the limited power value set for the power transmission end from being output to the power system, and effectively using the excess amount of power exceeding the rated power.

A second aspect of the present invention is a wind turbine generator including: a generator; and a control unit that generates, as an active power command value, a maximum active power that can be output by the generator, wherein the generator is controlled based on the active power command value generated by the control unit, and the wind turbine generator outputs active power resultant from subtracting auxiliary machine loss, which is power consumed by an auxiliary machine, from output power of the generator.

According to such a wind turbine generator, the generator outputs the maximum active power that can be output regardless of the rated power, or in other words, control is performed such that the generator power is maximized, thus enabling obtaining maximum generator power that makes the best possible use of wind energy.

Advantageous Effects of Invention

The present invention achieves an effect of enabling making use of wind energy as effectively as possible and increasing the amount of generated electricity that is supplied to a power system.

DESCRIPTION OF EMBODIMENTS

Below is a description of a wind turbine generator system and a wind turbine generator according to an embodiment of the present invention with reference to the drawings.

Figure 1:
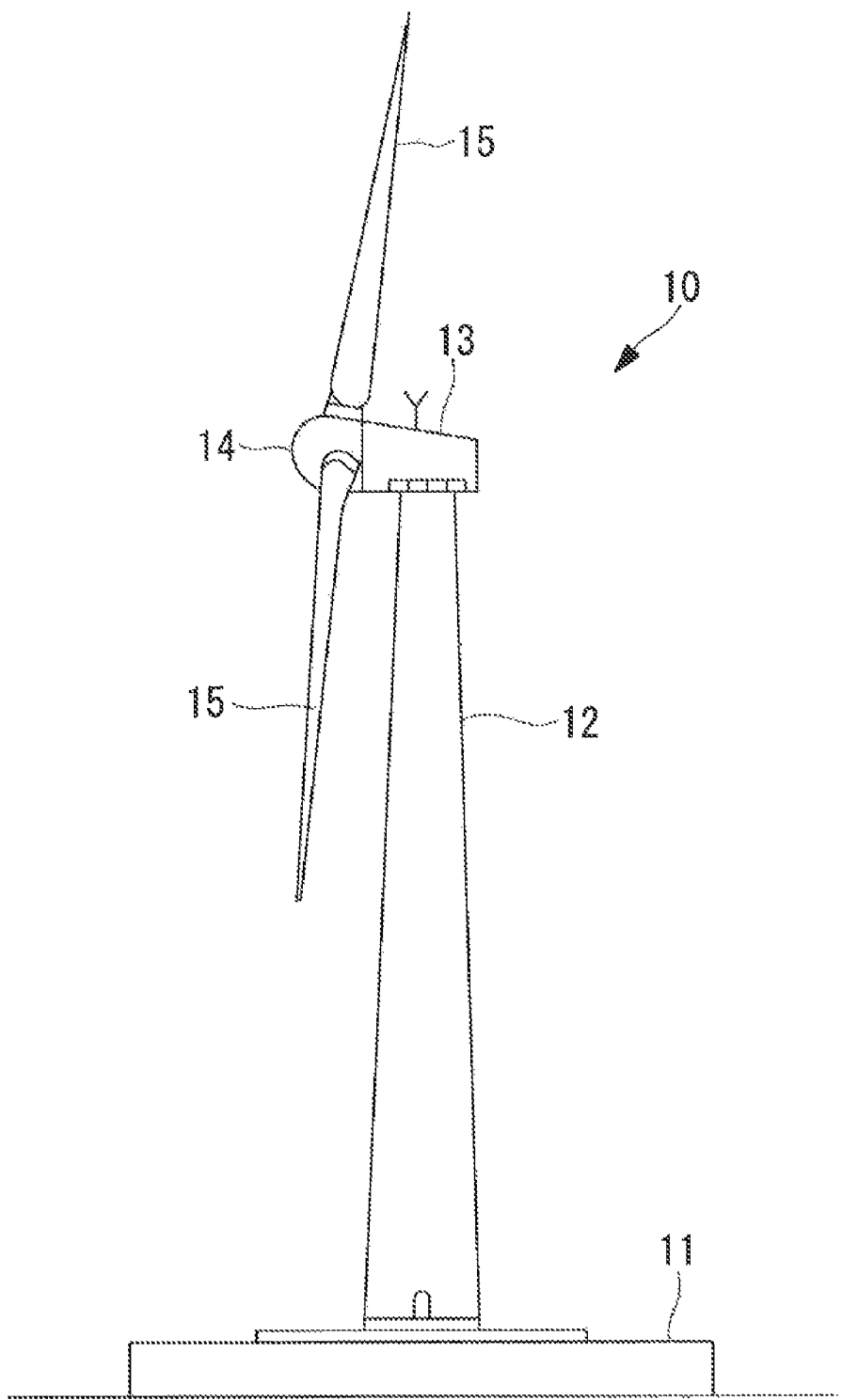
FIG. 1 is an external view of a wind turbine generator according to an embodiment of the present invention.
Figure 2:
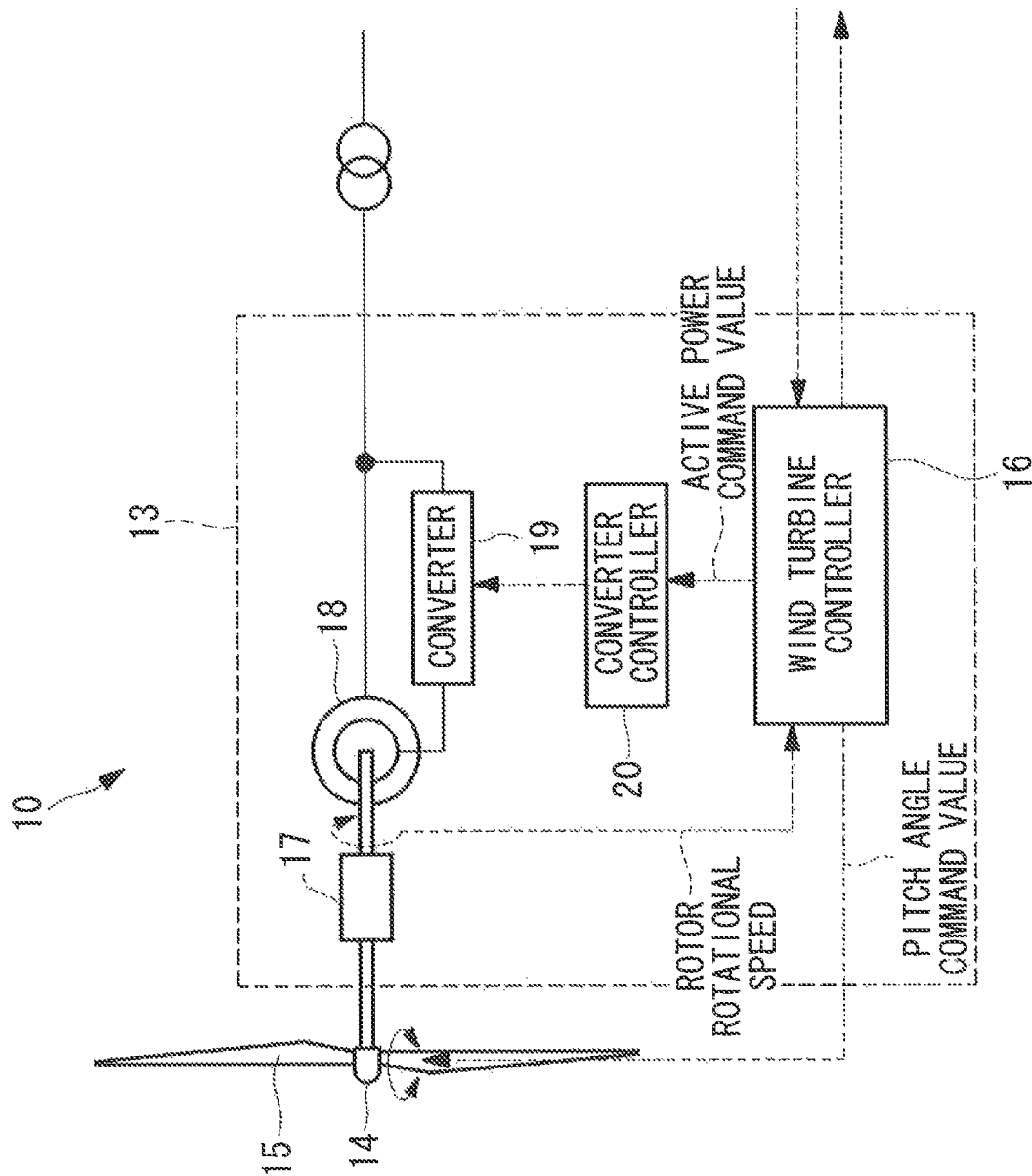
FIG. 2 is a diagram showing a schematic configuration of the wind turbine generator according to the embodiment of the present invention.

FIG. 1 is an external view of a wind turbine generator 10 according to the embodiment of the present invention, and FIG. 2 is a diagram showing a schematic configuration of the wind turbine generator 10.

The wind turbine generator 10 shown in FIG. 1 is a so-called variable-speed wind turbine and has a tower 12 provided upright on a foundation 11, a nacelle 13 disposed on the upper end of the tower 12, and a rotor head 14 provided on the nacelle 13 so as to be able to rotate about a substantially horizontal axis.

A plurality of blades 15 (e.g., three in the present embodiment) are attached to the rotor head 14 in a radial configuration around the rotation shaft line of the rotor head 14. The blades 15 are coupled to the rotor head 14 so as to be able to rotate in accordance with an operating condition, and the pitch angle of the blades 15 is variable.

As shown in FIG. 2, a gear box 17 and a generator 18 are mechanically coupled to the rotation shaft of the rotor head 14. The generator 18 may be a synchronous generator or an induction generator.

The rotor head 14 is caused to rotate about its rotation shaft by the force of wind striking the blades 15 in the direction of the rotation axis of the rotor head 14, the speed of the rotational force is increased by the gear box 17, and the resultant force is transmitted to the generator 18, which generates electricity.

The generator power is controlled by a converter controller 20 controlling a converter 19 based on an active power command value output from a wind turbine controller 16. Part of the generator power is consumed by various auxiliary machines included in the wind turbine generator 10, such as a control oil pump and an oil cooling fan, and the remaining power is output to the power system side as wind turbine-end power. Here, "auxiliary machine loss" is defined as the power consumed by auxiliary machines. Also, "wind turbine-end power" is expressed by the following equation.

Wind turbine-end power=generator power−auxiliary machine loss

Also, the gear box 17, the generator 18, the wind turbine controller 16, the converter controller 20, and the converter 19 are, for example, housed inside the nacelle 13.

Figure 3:
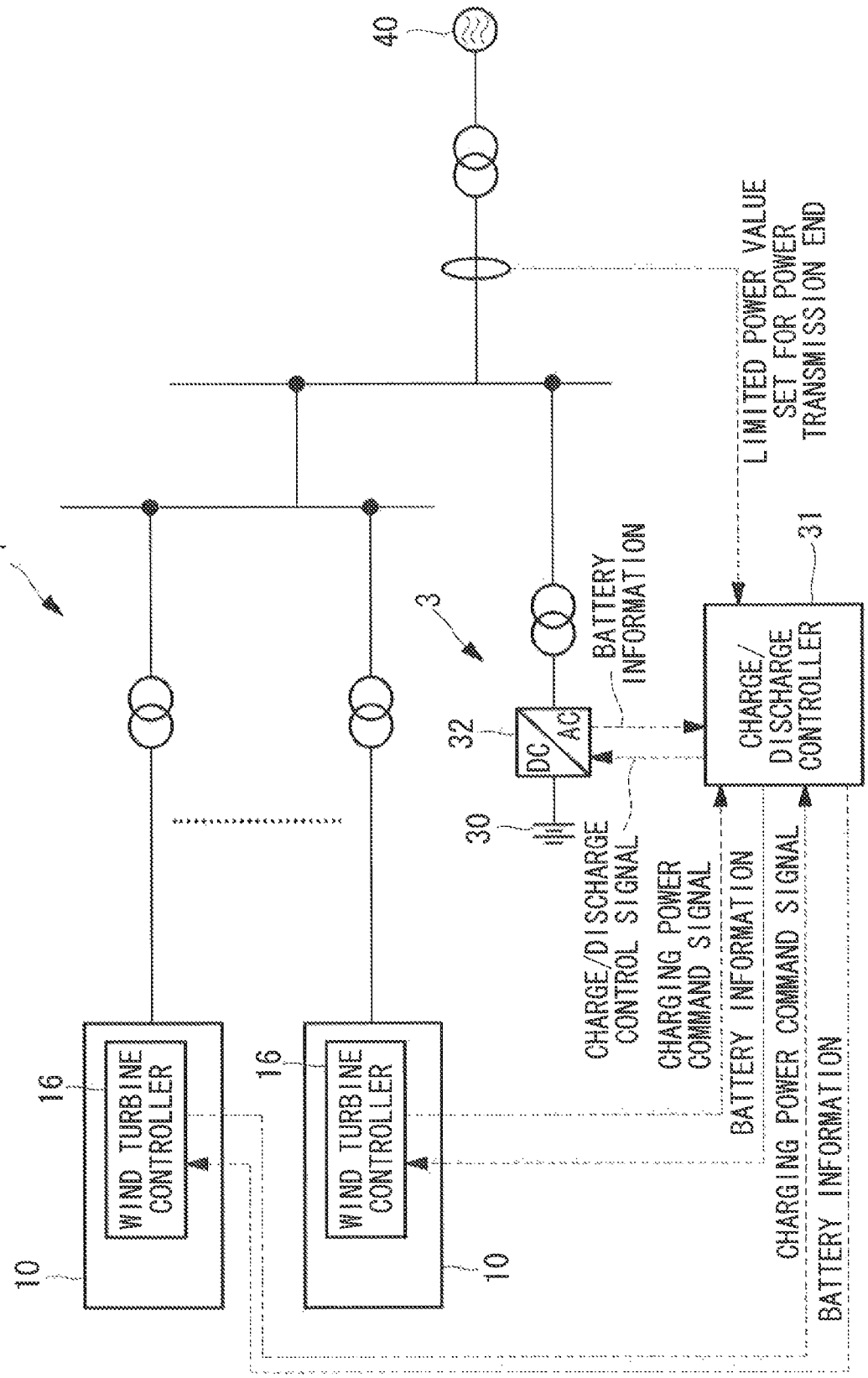
FIG. 3 is a diagram showing a schematic configuration of a wind turbine generator system according to the embodiment of the present invention.

FIG. 3 is a diagram showing a schematic configuration of a wind turbine generator system 1 according to the present embodiment. The wind turbine generator system 1 of the present embodiment includes a plurality of wind turbine generators 10. Active power output from the wind turbine generators 10 is supplied to a power system 40. A power storage system 3 is provided between the power system 40 and the wind turbine generators 10, and the power storage system 3 can be charged with part of the active power output from the wind turbine generators 10 and discharge stored power to the power system 40.

The power storage system 3 includes a power storage apparatus 30, a charge/discharge controller 31, and a power converter 32. The power storage apparatus 30 is interposed between and electrically connected to the wind turbine generators 10 and the power system 40. The charge/discharge controller 31 is capable of bidirectional communication with the wind turbine controllers 16 included in the wind turbine generators 10, and controls charging and discharging of the power storage apparatus 30 based on charging power command values received from the wind turbine controllers 16 of the wind turbine generators 10, as well as transmits battery information to the wind turbine controllers 16 of the wind turbine generators 10. Examples of the battery information include information regarding the power storage apparatus operation state, such as whether the power storage apparatus 30 is discharging, charging, or stopped, and information regarding the charging rate of the power storage apparatus 30.

The charge/discharge controller 31 also receives a limited power value set for the power transmission end from a power transmission facility provided on the system power side. The charge/discharge controller 31 transmits the limited power value set for the power transmission end to the wind turbine controllers 16 of the wind turbine generators 10.

Based on a charge/discharge control signal from the charge/discharge controller 31, the power converter 32 converts AC power output from the wind turbine generators 10 into DC power and stores the DC power in the power storage apparatus 30, and converts DC power stored in the power storage apparatus 30 into AC power and supplies the AC power to the power system 40.

Here, although the example of the wind turbine generator system 1 including one power storage system 3 is shown in FIG. 3, power storage systems 3 may be provided in one-to-one correspondence with the wind turbine generators 10, or each group of a plurality of wind turbine generators 10 may be provided with a respective power storage system 3.

Figure 4:
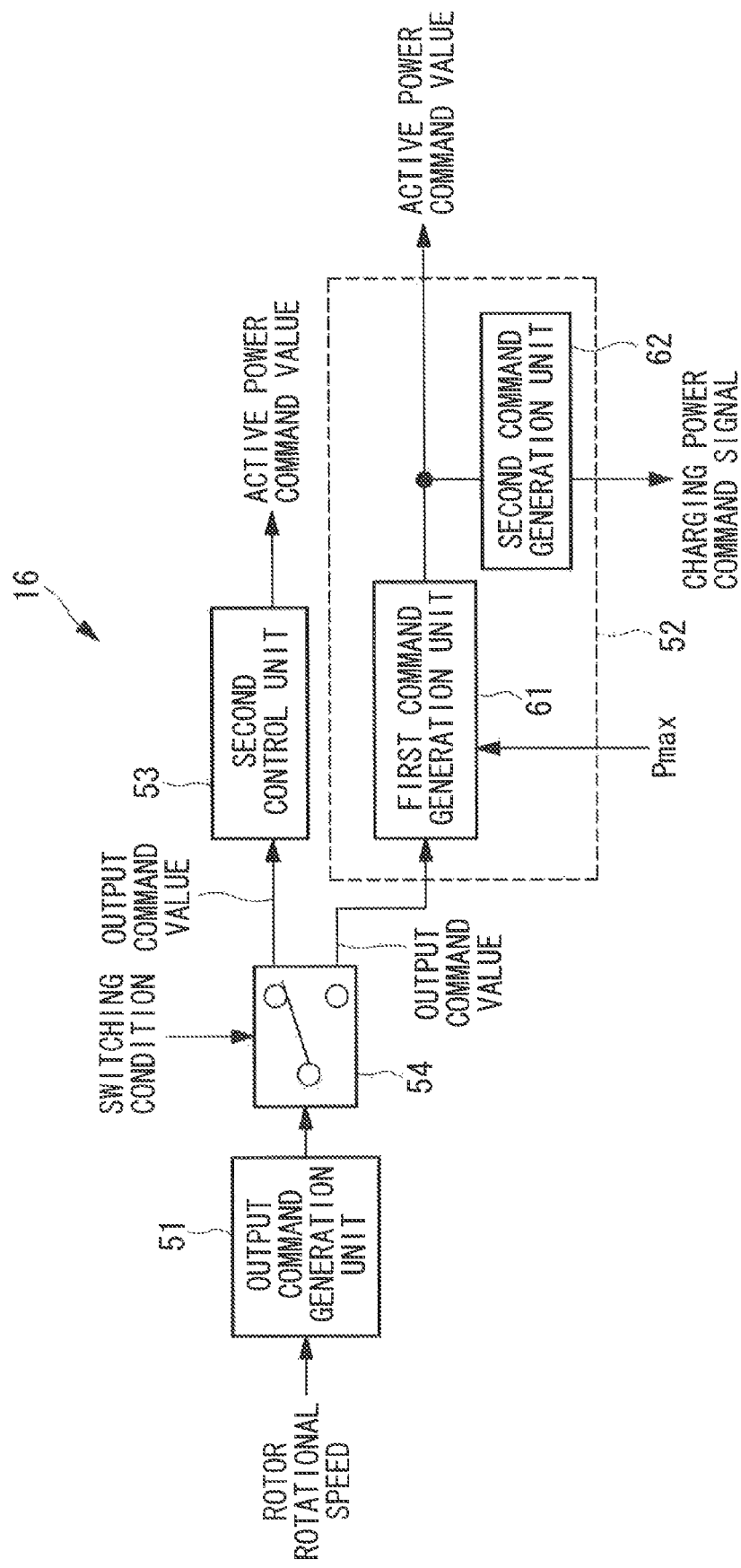
FIG. 4 is a functional block diagram schematically showing, among various types of functions included in a wind turbine controller according to the embodiment of the present invention, main functions related to the control of generator power.

FIG. 4 is a functional block diagram schematically showing, among various types of functions included in the wind turbine controller 16 of the wind turbine generator 10, main functions related to the control of generator power.

As shown in FIG. 4, the wind turbine controller 16 includes a power command generation unit 51 that generates a power command value based on the rotor rotational speed of the generator 18 (see FIG. 2), a first control unit 52 that performs control for maximizing generator power by referencing the power command value generated by the power command generation unit 51 and performs control such as making the best possible use of wind energy, and a selection unit 54 that selects either the first control unit 52 or a second control unit 53 based on a predetermined switching condition that is described later.

The power command generation unit 51 has a table in which rotor rotational speeds of the generator 18 are in correspondence with power command values, and the power command generation unit 51 acquires the power command value corresponding to the input rotor rotational speed of the generator 18 from the table, and outputs the power command value to the selection unit 54. Here, although the power command generation unit 51 generates a power command value using the rotor rotational speed in the present embodiment, the power command generation unit 51 may generate a power command value using the blade rotational speed or the like.

The first control unit 52 includes a first command generation unit 61 that generates an active power command value to be output to the converter controller 20 (see FIG. 2), and a second command generation unit 62 that generates a charging power command value to be output to the charged power controller 31 (see FIG. 3).

The first command generation unit 61 holds a maximum active power Pmax indicating the maximum amount of active power that the generator can output, which is determined based on, for example, constraints arising from the mechanical configuration of the wind turbine generator (e.g., the heat resistance of electrical equipment and the load of mechanical equipment), and outputs the maximum active power Pmax as the active power command value.

The second command generation unit 62 determines whether an amount of power obtained by subtracting auxiliary machine loss from the active power command value set by the first command generation unit 61, that is to say the wind turbine-end power, is less than or equal to the limited power value set for the power transmission end, and generates a charging power command value of zero if the wind turbine-end power is less than or equal to the limited power value set for the power transmission end.

Specifically, if the wind turbine-end power is less than or equal to the limited power value set for the power transmission end, the wind turbine-end power can be supplied to the power system 40 (see FIG. 3) even if it exceeds the rated power, and therefore in such a case, the wind turbine-end power is output to the power system 40 without the power storage apparatus 30 performing charging.

On the other hand, if the wind turbine-end power exceeds the limited power value set for the power transmission end, the amount by which the limited power value is exceeded, that is to say a value obtained by subtracting the rated power from the wind turbine-end power as shown in Equation (2), is generated as the charging power command value.

$$\text{Charging power command value} = \\ \text{wind turbine-end power} - \text{rated power} = \\ \text{active power command value} - \\ \text{auxiliary machine loss} - \text{rated power} \quad (2)$$

Specifically, if the wind turbine-end power exceeds the limited power value set for the power transmission end, all of the active power output from the wind turbine generator cannot be supplied to the power system 40 (see FIG. 3), and therefore the power storage apparatus 30 is charged with part of the active power, and an amount of power less than or equal to the limited power value set for the power transmission end is supplied to the power system 40.

Note that although the charging power command value, that is to say the amount of power with which the power storage apparatus 30 (see FIG. 3) is charged, is a value obtained by subtracting the rated power from the wind turbine-end power as shown in the above-described Equation (2) here, the amount of power with which the power storage apparatus 30 is charged is not limited to this.

Specifically, the amount of power with which the power storage apparatus 30 is charged needs only be an amount of power according to which the wind turbine-end power becomes less than or equal to the limited power value set for the power transmission end, and a configuration is possible in which, for example, the charging power command value is a value obtained by subtracting the limited power value set for the power transmission end from the wind turbine-end power, as shown in Equation (3) below.

$$\text{Charging power command value} = \text{wind turbine-end} \\ \text{power} - \text{limited power value set for power transmission end} \quad (3)$$

Also, the charging power command value may be a value obtained by multiplying the limited power value set for the power transmission end by a predetermined coefficient less than or equal to 1 and subtracting the resultant value from the wind turbine-end power, as shown in Equation (4).

$$\text{Charging power command value} = \text{wind turbine-end} \\ \text{power} - (\text{limited power value set for power transmission end} * \alpha) \quad (4)$$

In the above-described Equation (4), $\alpha$ is a predetermined coefficient less than or equal to 1, examples of which include 0.95, 0.90, 0.85, and 0.80.

The active power command value generated by the first command generation unit 61 is output to the converter controller 20 shown in FIG. 2, and the charging power command value generated by the second command generation unit 62 is transmitted to the charge/discharge controller 31 of the power storage system 3 shown in FIG. 3.

The selection unit 54 selects the first control unit 52 if the power storage apparatus 30 of the power storage system 3 shown in FIG. 3 is in a chargeable state, the wind speed is greater than or equal to the rated wind speed, and the power storage apparatus 30 is not currently discharging. The selection unit 54 selects the second control unit 53 if even any one of the above-described switching conditions is not satisfied.

As information indicating whether the wind speed is greater than or equal to the rated wind speed, it is possible to use an input value measured by an anemometer (not shown) attached to the wind turbine generator 10. Also, the determination with respect to information regarding the power storage apparatus 30 is made based on battery information received from the charge/discharge controller 31. The determination as to whether the power storage apparatus 30 is in a chargeable state is made by determining, for example, whether the charging rate of the power storage apparatus 30 is less than or equal to a predetermined charging rate that has been set in advance (e.g., 60%).

Next is a description of operations performed in the wind turbine generator system 1 of the present embodiment having the above-described configuration, with reference to FIGS. 2 to 4.

Firstly, the charge/discharge controller 31 of the power storage system 3 shown in FIG. 3 generates battery information and transmits the battery information to the wind turbine controllers 16 of the wind turbine generators 10. The limited power value set for the power transmission end is also transmitted.

In each wind turbine generator 10, the rotor rotational speed of the generator 18 and the wind speed are measured by sensors (not shown), and these measured values are input to the wind turbine controller 16.

In the wind turbine controller 16, the power command generation unit 51 generates a power command value based on the input rotor rotational speed of the generator, and outputs the power command value to the selection unit 54. The selection unit 54 selects the first control unit 52 or the second control unit 53 based on the battery information transmitted from the charge/discharge controller 31 and the wind speed measured by a wind speed sensor (not shown) disposed in the wind turbine generator 10.

Specifically, the first control unit 52 is selected if the power storage apparatus 30 is in a chargeable state, the wind speed is greater than or equal to the rated wind speed, and the power storage apparatus 30 is not currently discharging, and otherwise the second control unit 53 is selected. The power command value generated by the power command generation unit 51 is output to the selected control unit.

If the second control unit 53 has been selected, the second control unit 53 generates an active power command value based on the rotor rotational speed of the generator, and outputs the active power command value to the converter controller 20, which controls the converter 19. Accordingly, control is performed such that, for example, the wind turbine-end power is constant at the rated power, and the rated power is supplied to the power system 40.

On the other hand, if the first selection unit 52 has been selected, the first command generation unit 61 sets the maximum amount of active power that the generator can output as the active power command value, and outputs the active power command value to the converter controller 20. The converter controller 20 then controls the converter 19 based on the active power command value, thus obtaining generator power based on the active power command value. This obtains the maximum amount of active power that can be output by the generator 18 as the generator power.

Part of this generator power is consumed by auxiliary machines, and the remaining amount of power is output from the wind turbine generator 10 to the power system side as the wind turbine-end power. For example, if the rated power is 2,400 kW, the auxiliary machine loss is 50 kW, and the active power command value is 2,520 kW, active power command value−auxiliary machine loss=2,520 kW−50 kW=2,470 kW, and power that is 70 kW over the rated power of 2,400 kW is output from the wind turbine generator 10 to the power system side.

Also, the second command generation unit 62 of the wind turbine controller 16 determines whether the active power obtained by subtracting the auxiliary machine loss from the active power command value generated by the first command generation unit 61, that is to say the wind turbine-end power, is less than or equal to the limited power value set for the power transmission end. As a result, a charging power command value of zero is generated if the wind turbine-end power is less than or equal to the limited power value set for the power transmission end, a value obtained by subtracting the rated power from the wind turbine-end power is generated as the charging power command value if the wind turbine-end power exceeds the limited power value set for the power transmission end, and the generated charging power command value is transmitted to the charge/discharge controller 31.

Accordingly, the wind turbine generator 10 in which the selection unit 54 selected the first control unit 52 outputs an amount of power greater than or equal to the rated power to the power system 40 and transmits the charging power command value to the charge/discharge controller 31.

The charge/discharge controller 31 adds up the charging power command values received from the wind turbine generators 10, and controls the power converter 32 based on the resulting charging power command value. Accordingly, the power storage apparatus 30 is charged with the excess amount of power from the wind turbine generators 10.

As described above, according to the wind turbine generator system 1 and the wind turbine generator 10 of the present embodiment, the wind turbine generator 10 performs control so as to maximize the generator power, and an amount of power obtained by subtracting the auxiliary machine loss corresponding to the amount of power consumed by auxiliary machines from the generator power is output to the power system side as the wind turbine-end power, thus preventing the generator power from being suppressed by the rated power and enabling obtaining maximum generator power that makes the best possible use of wind energy.

Furthermore, if the amount of power output from the wind turbine generator 10 in this way exceeds the limited power value set for the power transmission end, control is performed such that the power storage apparatus 30 is charged with an amount of power greater than or equal to the excess amount. Accordingly, even if an amount of power that exceeds the limited power value set for the power transmission end is output from the wind turbine generator 10, that excess amount can be effectively used by being stored in the power storage apparatus 30.

By performing control such as that described above, the amount of generated power supplied to the power system 40 can be increased as described below.

Figure 5:
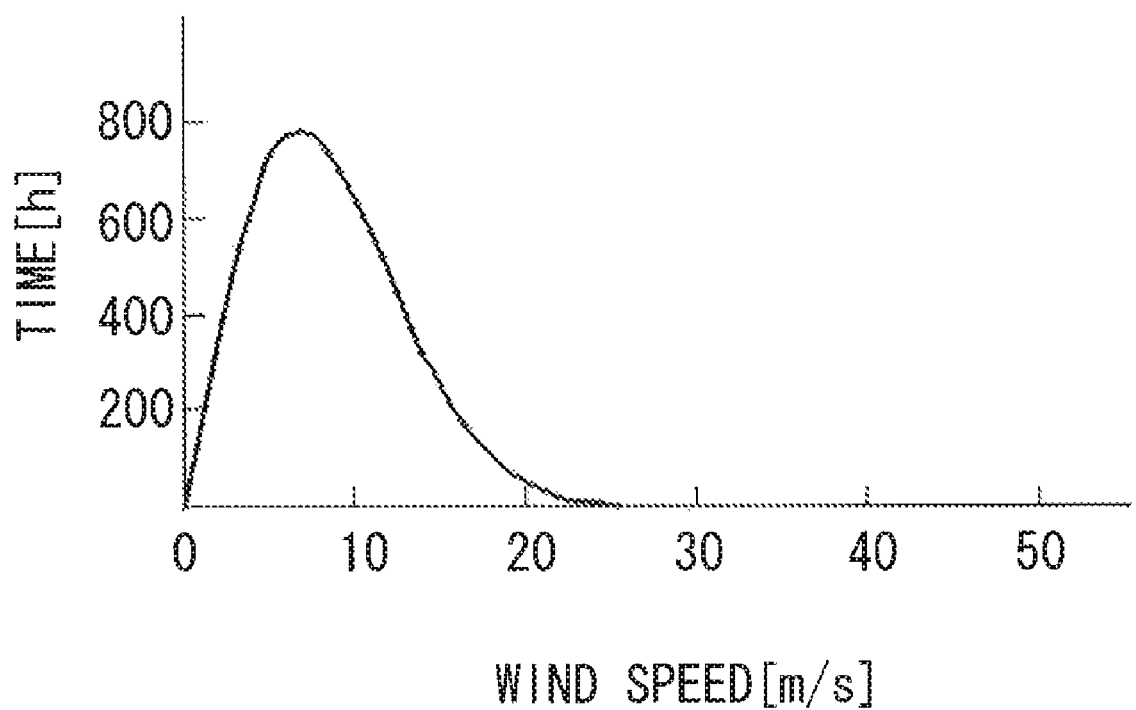
FIG. 5 is a diagram illustrating an effect of the present invention.

For example, in an IEC Class II (fatigue load) wind situation, assuming that the wind speed occurrence-frequency distribution conforms to the Rayleigh distribution as shown in FIG. 5, the time for which the first control unit 52 is selected in the above-described wind turbine controller 16 and the operating state for obtaining an excess of 70 kW over the rated power is maintained is 2,070 hours, assuming that the annual operation rate of the wind turbine generator 10 is 100%.

It was found that assuming that the power storage apparatus 30 is charged with the entirety of the excess 70 kW during that time, that amount of power would be 144.9 MWh per year, and therefore 144.9 MWh of power would be obtained from a single wind turbine as excess power exceeding the rated power. This amount of power corresponds to, for example, 1% to 2% of the total power obtained by a general wind turbine generator system, thus enabling an improvement of 1% to 2% in the annual generated power amount.

Also, according to the wind turbine generator system 1 and the wind turbine generator 10 of the present embodiment, the wind turbine-end power is output to the power system 40 if it is less than or equal to the limited power value set for the power transmission end. In this case, although the active power output to the power system 40 is greater than or equal to the rated power, there is not problematic in a wind turbine generator system 1 that includes a plurality of wind turbine generators 10 since such a variation in active power is marginal when compared to total power.

Also, the frequency with which the power storage apparatus 30 is charged can be reduced by outputting the wind turbine-end power to the power system 40 even if it exceeds the rated power, as long as it is less than or equal to the limited power value set for the power transmission end. Since some energy loss always occurs when charging the power storage apparatus 30, energy loss due to charging can be reduced by increasing the frequency of output to the power system 40 instead of charging the power storage apparatus 30 in this way.

REFERENCE SIGNS LIST

1 wind turbine generator system
3 power storage system
10 wind turbine generator
16 wind turbine controller
18 generator
30 power storage apparatus
31 charge/discharge controller
40 power system
52 first control unit
54 selection unit
61 first command generation unit
62 second command generation unit

The invention claimed is:

1. A wind turbine generator system comprising:
a wind turbine generator connected to a power system;
a power storage apparatus capable of being charged with power generated by the wind turbine generator or power supplied from the power system; and
a charge/discharge controller that is capable of bidirectional communication with the wind turbine generator and controls charging and discharging of the power storage apparatus,
wherein
the wind turbine generator includes a generator which is controlled based on a maximum active power, as an active power command value, which can be output by the generator and which outputs active power,
the wind turbine generator outputs active power resultant from subtracting auxiliary machine loss, which is power consumed by an auxiliary machine, from the active power output from the generator, and
the charge/discharge controller causes the power storage apparatus to be charged with part of the active power output from the wind turbine generator in a case where the active power output from the wind turbine generator exceeds a limited power value set for a power transmission end.

2. The wind turbine generator system according to claim 1, wherein in a case where the power storage apparatus is in a chargeable state, the wind speed is greater than or equal to a rated wind speed, and the power storage apparatus is not currently discharging, the wind turbine generator outputs active power resultant from subtracting the auxiliary machine loss from the maximum active power that can be output by the generator.

3. The wind turbine generator system according to claim 1, wherein the charge/discharge controller causes the power storage apparatus to be charged with active power resultant from subtracting a rated power of the wind turbine generator from the active power output from the wind turbine generator.

4. The wind turbine generator system according to claim 1, wherein the charge/discharge controller causes the power storage apparatus to be charged with active power resultant from subtracting electrical power obtained by multiplying the limited power value set for the power transmission end by a predetermined coefficient less than or equal to 1, from the active power output from the wind turbine generator.

5. A wind turbine generator comprising:
a generator; and
a control unit that generates, as an active power command value, a maximum active power that can be output by the generator,
wherein the generator is controlled based on the active power command value generated by the control unit, and
the wind turbine generator outputs active power resultant from subtracting auxiliary machine loss, which is power consumed by an auxiliary machine, from output power of the generator.

6. A wind turbine generator system comprising:
a wind turbine generator connected to a power system;
a power storage apparatus capable of being charged with power generated by the wind turbine generator or power supplied from the power system; and
a charge/discharge controller that is capable of bidirectional communication with the wind turbine generator and controls charging and discharging of the power storage apparatus,
wherein the wind turbine generator includes
a wind turbine controller; and
a generator which is controlled based on an active power command output from the wind turbine controller;
wherein the wind turbine controller includes a first control unit for setting a maximum active power that can be output by the generator as the active power command value,
wherein the charge/discharge controller causes the power storage apparatus to be charged with part of the active power output from the wind turbine generator in a case where a value obtained by subtracting auxiliary machine loss, which is power consumed by an auxiliary machine, from the active power command value set by the first control unit exceeds a limited power value set for a power transmission end which is set greater than a rated power of the wind turbine generator.

7. The wind turbine generator system according to claim 6, wherein the wind turbine controller includes
a plurality of control units including the first control unit, and
a selection unit which selects the first control unit in a case where the power storage apparatus is in a chargeable state, the wind speed is greater than or equal to a rated wind speed, and the power storage apparatus is not currently discharging.

8. The wind turbine generator system according to claim 6, wherein in a case where the value obtained by subtracting the auxiliary machine loss from the active power command value exceeds the limited power value, the charge/discharge controller causes the power storage apparatus to be charged with active power resultant from subtracting the rated power of the wind turbine generator from the active power output from the wind turbine generator.

9. The wind turbine generator system according to claim 6, wherein in a case where the value obtained by subtracting the auxiliary machine loss from the active power command value exceeds the limited power value, the charge/discharge controller causes the power storage apparatus to be charged with active power resultant from subtracting electrical power, obtained by multiplying the limited power value set for the power transmission end by a predetermined coefficient less than or equal to 1, from the active power output from the wind turbine generator.

10. The wind turbine generator system according to claim 6, wherein the wind turbine controller includes
  a second control unit for setting an active power command value based on a rotor rotational speed of the generator, and
  a selection unit which selects the first control unit in a case where a switching condition is satisfied such that the power storage apparatus is in a chargeable state, a wind speed is greater than or equal to a rated wind speed, and the power storage apparatus is not currently discharging, and selects the second control unit in a case where the switching condition is not satisfied, and
  wherein the charge/discharge controller causes the power storage apparatus to be charged with part of the active power output from the wind turbine generator in a case where the first control unit is selected by the selection unit and the value obtained by subtracting the auxiliary machine loss from the active power command value set by the first control unit exceeds the limited power value.

11. The wind turbine generator system according to claim 10, wherein the second control unit sets the active power command value such that the active power output from the wind turbine generator so as to be constant at the rated power of the wind turbine generator.

12. The wind turbine generator system according to claim 10, wherein in a case where the first control unit is selected by the selection unit and in a case where the value obtained by subtracting the auxiliary machine loss from the active power command value exceeds the limited power value, the charge/discharge controller causes the power storage apparatus to be charged with active power resultant after subtracting the rated power of the wind turbine generator from the active power output from the wind turbine generator.

13. The wind turbine generator system according to claim 10, wherein in a case where the first control unit is selected by the selection unit and where the value obtained by subtracting the auxiliary machine loss from the active power command value exceeds the limited power value, the charge/discharge controller causes the power storage apparatus to be charged with active power resultant after subtracting electrical power obtained by multiplying the limited power value by a predetermined coefficient less than or equal to 1, from the active power output from the wind turbine generator.

14. The wind turbine generator system according to claim 10,
  wherein the first control unit includes a second command generation unit for generating a charging power command value to be output to the charge/discharge controller, and
  wherein the second command generation unit is configured to
  determine whether a difference value obtained by subtracting the auxiliary machine loss from the maximum active power that is configured to be output by the generator is less than or equal to the limited power value set for the power transmission end,
  generate a zero as the charging power command value if the difference value is less than or equal to the limited power value, and
  generate active power resultant after subtracting electrical power obtained by multiplying the limited power value by a predetermined coefficient less than or equal to 1, from the maximum active power that is configured to be output by the generator as the charging power command value if the difference value is greater than the limited power value.

* * * * *